June 11, 1963  H. J. PREMO  3,093,199
ICE AUGER
Filed Sept. 1, 1961
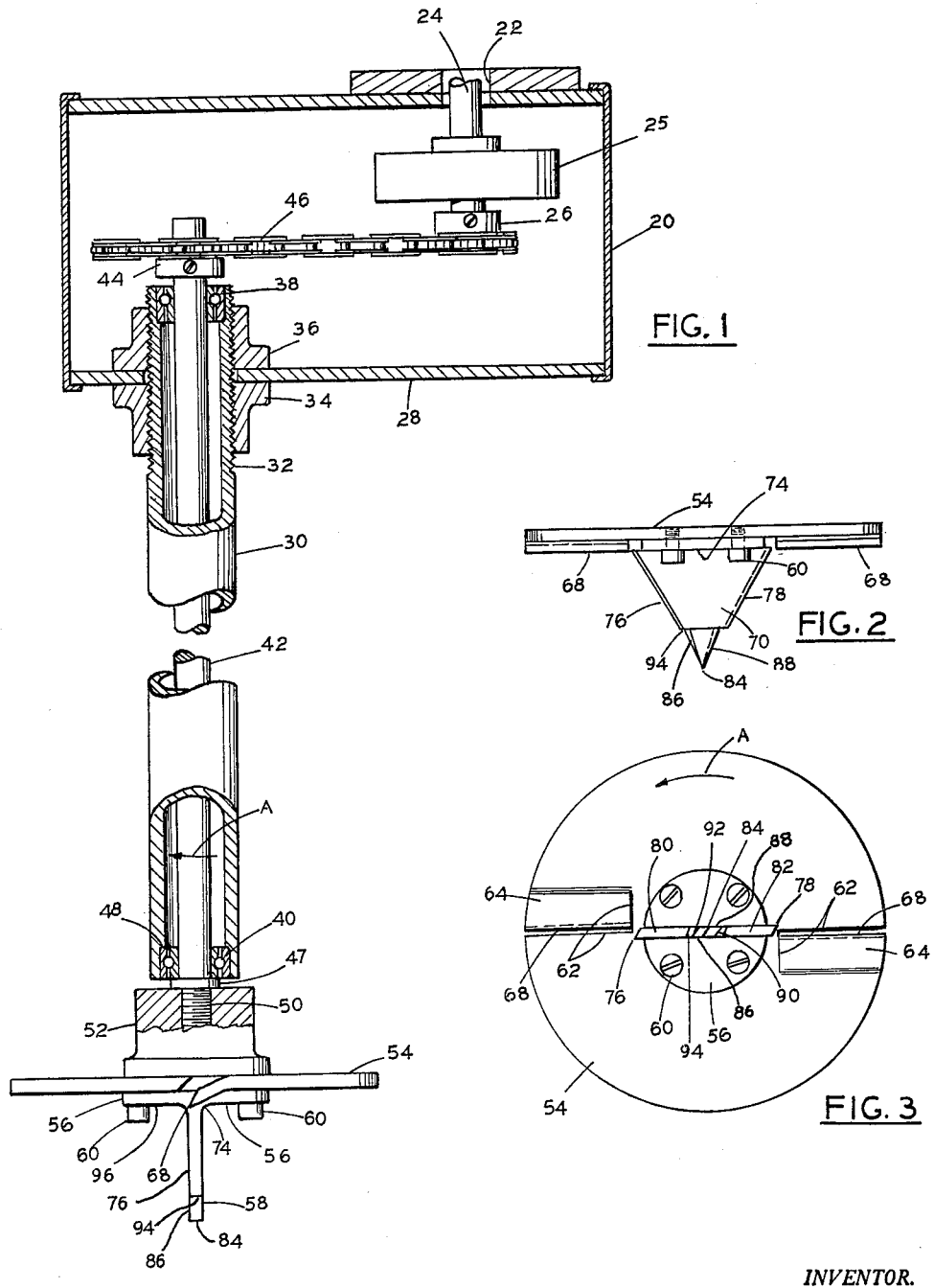
INVENTOR.
HOWARD. J. PREMO
BY
ATTORNEY 3,093,199
ICE AUGER
Howard J. Premo, 3 Clary St., Massena, N.Y.
Filed Sept. 1, 1961, Ser. No. 135,553
1 Claim. (Cl. 175—18)

This invention relates to an ice auger for preparing apertures for fishing through frozen over inland lakes and the like.

In ice fishing, it is essential that the lake, or body of water be sufficiently frozen over and solid to a depth to support fishermen and their vehicles. The present invention is directed to an ice auger adapted to quickly drill apertures through a heavy thickness of solid ice of sufficient size to permit fishing below the ice, the aperture necessarily being large enough to permit extraction therethrough of fish caught on the ice fishing line.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claim.

In the drawings, wherein like reference characters indicate like parts:

FIGURE 1 is a front elevation of the ice fishing auger with parts of the drive means broken away and shown in section.

FIGURE 2 is a side elevational view of the auger; and

FIGURE 3 is a bottom plan view of the auger.

Referring to the drawings, there is shown a drive casing 20 into which, through an aperture 22 in the upper wall projects a drive shaft 24, driven by a suitable source of power not shown, external of the casing. A clutch 25, of any suitable type may be provided between the drive shaft 24, and the small sprocket 26. Mounted in the lower wall 28 of the casing is a hollow drive shaft support tube 30, the upper end of which is externally threaded as at 32 and provided with threaded clamp nuts 34 and 36. The drive tube is provided with upper and lower anti-friction bearings 38 and 40 for the driven shaft 42.

On the upper end of the shaft 42, is provided a relatively large sprocket 44, which is driven by a roller chain 46 from the sprocket 26. The lower end of the shaft projects beyond the bearing 40, and the lower end of the tube, and is provided with a thrust shoulder 47 that bears against the inner race of the lower bearing 40. The outer race of the lower bearing which bearing is adapted to withstand thrust, is seated in an annular shoulder 48 in the lower end of the tube 30.

The lower end of the shaft 42 is provided with a threaded shank 50, upon which is threaded the cutter head or hub 52. A disk cutter plate 54 of circular form is clamped to the hub between the circular base 56 of a pilot cutter 58, by means of studs 60, threaded into the hub 52. The cutter plate is provided with L slots 62 on opposite sides to provide angularly inclined cutter teeth 64, each having cutting edges such as 68. Such cutters extending inwardly approximately one third of the diameter of the disk. The pilot cutter 58, comprises a triangular plate 70, welded or otherwise secured to the circular base 56, as at 74, such base being of about a third of the diameter of the disk. The triangular plate is provided with cutting edges 76 and 78 disposed at an angle of about 60° to the base 56 and clearances ground at approximately 60° as indicated at 80 and 82, and such edges extend from the base 56 to a point approximately three-fourths the axial length of the pilot. The tip end of the plate 70 is pointed to form an apex cutting edge as at 84 and cutting edges 86 and 88 at angles slightly greater than 60° from a plane transverse to the auger axis, are formed by clearances ground at approximately 45° as is indicated at 90 and 92, the cutting edges 86 and 88 extending to the slight shoulder 94 formed at the ends of the cutting edges 76 and 78.

The cutting edges 68 preferably lie in a plane at or slightly below the underside 96 of the base 56. In practice the cutting parts will be suitably hardened to provide long service, and the cutting edges 68 will form approximate extensions of the cutting edges 76 and 78.

From the foregoing, it will be seen that the apex cutting edge 84, which due to the 45° clearances, extends at an angle of 45° to the plane of the plate 58 and cutting edges 86 and 88 will quickly enter the ice surface followed by cutting edges 76 and 78 which will quickly cut a conical centering recess in the ice, and act as a pilot, so as to hold the cutter while the cutting edges 68, with their planing action, cut in and remove ice to form a hole of the diameter of the disk 54. The casing 20, with its sprocket reduction gear, provides a torque arm, and will be disposed at a suitable height to be held by an operator, who will exert downward thrust during the drilling operation.

While a single form of the invention has been illustrated and described, it is to be understood that the invention is not limited thereto. As various changes in the construction and arrangement may be made without departing from the spirit of the invention, as will be apparent to those skilled in the art, reference will be had to the appended claim for a definition of the limits of the invention.

What is claimed is:

An ice auger comprising a hub, a disk secured to the hub having opposed radial cutting edges inclined downwardly below the plane of the disk, a central pilot cutter comprising a circular base and a generally triangular cutter plate, extending therefrom and mounted below said disk, said pilot cutter having inclined cutting edges extending from the base to a shoulder portion short of the apex of the triangular plate, and having approximately 60° clearance therebehind, and initial cutting edges extending from the shoulder portion to the apex inclined at a greater angle from the base, and having approximately 45° clearance therebehind, said last named cutting edges converging in an apex cutting edge extending parallel with the base, and at an angle approximately 45° from the plane of the plate.

References Cited in the file of this patent

UNITED STATES PATENTS

| 256,457 | Brunner | Apr. 18, 1882 |
| 2,107,958 | Pribyl | Feb. 8, 1938 |
| 2,673,717 | Bacon | Mar. 30, 1954 |
| 2,893,695 | Gerlikowski | July 7, 1959 |
| 2,972,389 | Green et al. | Feb. 21, 1961 |
| 2,975,848 | Roberts | Mar. 21, 1961 |